United States Patent [19]

Mawyer, Sr.

[11] Patent Number: 5,463,372
[45] Date of Patent: Oct. 31, 1995

[54] SELF-SET VEHICLE ANTI-THEFT/ANTI-HIJACKING SYSTEM WITH PARTIAL DISABLEMENT FOLLOWED BY COMPLETE SHUTDOWN

[76] Inventor: Ralph A. Mawyer, Sr., 8202 Blairton Rd., Springfield, Va. 22152-1805

[21] Appl. No.: 141,533

[22] Filed: Oct. 27, 1993

[51] Int. Cl.⁶ .................................................. B60R 25/10
[52] U.S. Cl. ................... 340/428; 340/309.15; 340/426; 307/10.3; 307/10.6; 180/287
[58] Field of Search ..................................... 340/426, 428, 340/539, 309.15, 309.5; 307/10.6, 10.3; 180/287

[56] References Cited

U.S. PATENT DOCUMENTS

| | | | |
|---|---|---|---|
| 3,781,789 | 12/1973 | Caleskie et al. | 307/10.3 |
| 4,067,411 | 1/1978 | Conley et al. | 340/426 X |
| 4,107,543 | 8/1978 | Kaplan | 340/428 |
| 5,172,094 | 12/1992 | Stadler | 340/426 X |
| 5,307,048 | 4/1994 | Sonders | 340/426 |
| 5,315,286 | 5/1994 | Nolan | 340/426 |

Primary Examiner—John K. Peng
Assistant Examiner—Edward Lefkowitz
Attorney, Agent, or Firm—Eli Lieberman

[57] ABSTRACT

An anti-hijacking and anti-theft vehicle security protection system is designed to permit, in the anti-hijacker function, the hijacker to drive off with the vehicle but within about two minutes the engine will be partially disabled to permit maneuvering the vehicle out of traffic to the side of the road. A few minutes later, the engine will be totally disabled and signalling devices can be activated. The system employs two overlapped timers under control of a sensor relay. A reset button under control of an authorized user can deenergize the sensor relay to return the system to normal. Also included within the design is anti-theft protection for an unattended vehicle which can be selected to function in any one of 3 conditions, one condition being the anti-hijacking function. In the second condition, operation of the vehicle is first partially disabled and then completely shut off. In the third condition, the vehicle cannot be started, and hazard lights and alarm are activated.

15 Claims, 1 Drawing Sheet

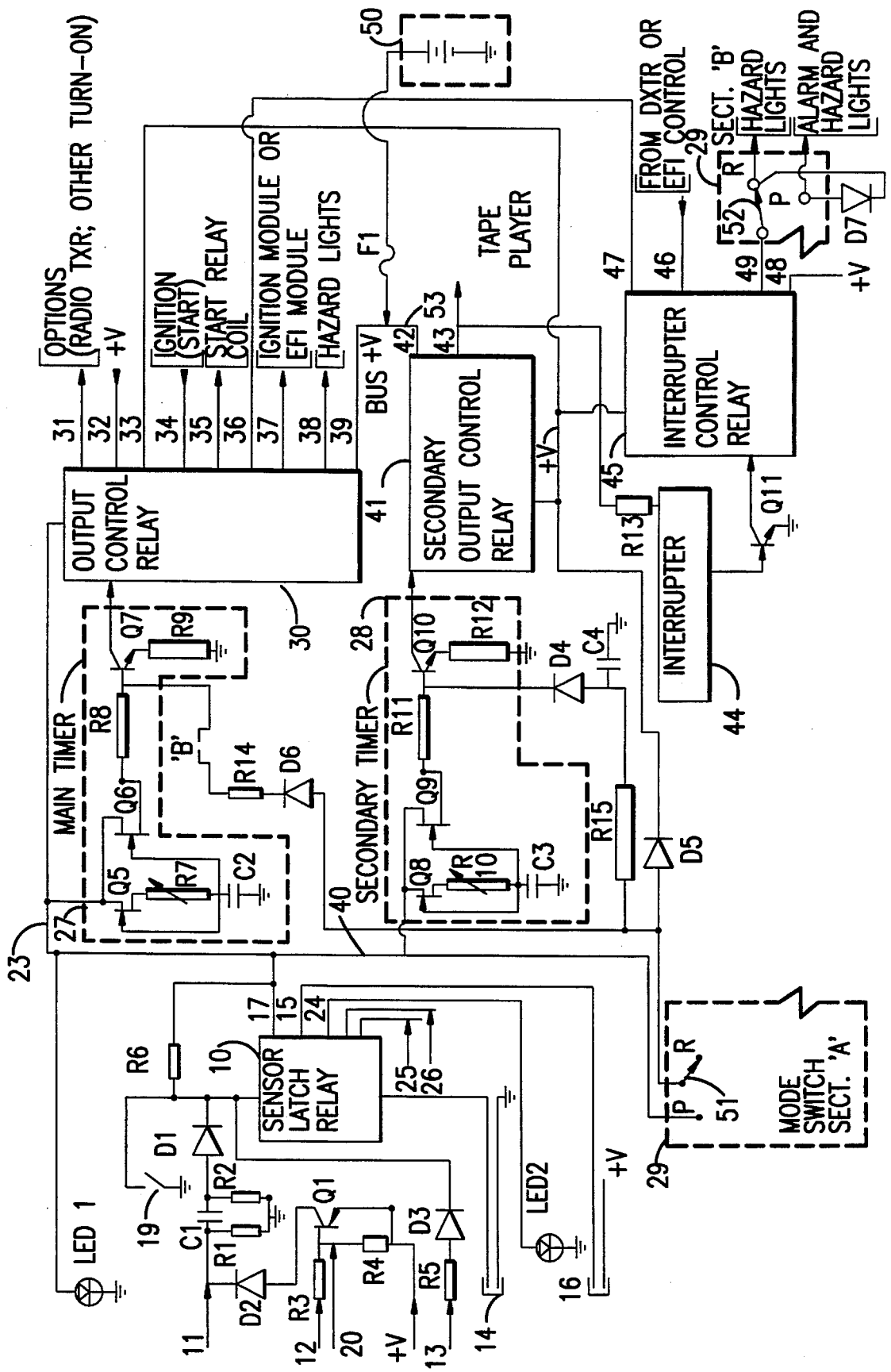

SELF-SET VEHICLE ANTI-THEFT/ANTI-HIJACKING SYSTEM WITH PARTIAL DISABLEMENT FOLLOWED BY COMPLETE SHUTDOWN

BACKGROUND OF THE INVENTION

This invention relates to a security protection system for protecting a motor vehicle both against theft by hijacking and theft while the vehicle remains unattended in a parked position. There are numerous patents in the prior art which address the problem of theft of a parked vehicle, but few address the problem of hijacking. In theft by hijacking, the owner is accosted by an armed thief while approaching the parked vehicle or while preparing to drive off and forced to surrender the vehicle. Being in a state of panic the owner is in no position to take any protective action for his or her vehicle, the only thought in mind is to surrender the vehicle without suffering physical harm and fleeing to safety.

When faced with a hijacking situation, it is in the best interests of the victim to let the hijacker drive off with the vehicle, thereby avoiding possible physical harm. It is also in the interest of the vehicle owner to have the vehicle disabled without travelling too far from the point of theft.

The hijacking problem is addressed in U.S. Pat. No. 5,172,094, issued Dec. 15, 1992 to David M. Stadler. A passive protection system is disclosed wherein opening of a vehicle door or an attempt to start the vehicle motor initiates a predetermined time cycle. If a reset signal is not received before the end of the time cycle, a vehicle disabling circuit is set which is activated by pressing the brake pedal.

U.S. Pat. No. 4,107,543, issued Aug. 15, 1978 to Neil B. Kaplan, shows a passive vehicle anti-theft system utilizing a combination of condition responsive switching components which are automatically armed as the authorized user leaves the vehicle and closes the last vehicle door. This system does not employ a timing device to provide for disablement of the vehicle within a controlled time period.

While the prior art does teach automatically armed anti-theft vehicle protection systems useful for hijacking protection, none of the prior art shows a totally armed system providing a period of partial disablement before final engine shutdown as accomplished by the present invention. It is desirable to provide a partial disablement to give the hijacker an opportunity to get out of traffic and maneuver the vehicle to the side of the road before the engine is turned off.

SUMMARY OF THE INVENTION

The overall object of the present invention is to provide a motor vehicle passive anti-theft system which achieves protection from hijacking as well as theft of unattended vehicles.

It is a specific object of the invention to provide an anti-hijacking protection system which allows a short grace period wherein the hijacker can leave the scene of the crime and travel a short distance before a partial disablement of the vehicle engine commences. During this partial disablement, the hijacker has the opportunity to maneuver the vehicle out of traffic to the side of the road, possibly avoiding accidents as compared to systems which cut off vehicle operation precipitously.

It is another object of the invention to provide a main timer and a secondary timer operating in an overlapped timing function to provide a grace period of approximately two minutes before partial disablement of the vehicle commences and allowing the vehicle to continue operation in partial disablement for approximately four to eight minutes before final engine shutdown. The timers are simultaneously energized by a latching relay set by inputs triggered by door opening or engine starting operations.

It is a further object of the invention to automatically arm the security protection system while the driver exits the vehicle. After opening the door to leave, a reset button is pressed to reset the system to prepare it to be automatically armed in case of unauthorized entry. Upon returning to the vehicle, the reset button must be pressed after starting the engine in order to properly operate the vehicle.

It is yet another object of the invention to provide a mode switch to convert the system wherein it emphasizes protection of an unattended vehicle. The mode switch, when placed in the park (P) position, bypasses the two timers eliminating the initial two minutes grace period, and four to eight minute partial disablement period, and disables the vehicle immediately upon unauthorized door opening or attempted engine starting.

It is another object of the invention to provide optional signaling and other operational features which greatly enhance the utility of the disclosed invention.

BRIEF DESCRIPTION OF THE DRAWING

The single drawing is a part schematic circuit diagram of the overall system including optional features.

DESCRIPTION OF THE INVENTION

Referring to the sole FIGURE of the drawing, a sensor latch relay 10 is provided with a number of inputs, here shown as 11, 12 and 13, each being an independent input. Relay 10 is a commercially available double pole/double throw relay. Such a relay is available from Arcade Electronics as type HB25, 5V, 2A DPDT Relay.

Input 11 would be used for vehicles which generate a positive voltage at the vehicle door light switch when the door is opened. A sensed voltage at input 11 is coupled through capacitor C1 and diode D1 to the coil of sensor latch relay 10 to operate the relay. A resistor R1 is connected between the input to capacitor C1 and ground, and a resistor R2 is connected between the output of capacitor C1 and ground. These two resistors act as bleeder resistors for discharging capacitor C1 when no input is present.

Input 12 would be used for vehicles that provide a ground connection by the door light switch when the door is opened. Sensed ground at input 12 is applied to transistor Q1, via resistor R3, driving transistor Q1 conductive upon sensing ground at input 12. A resistor R4 has one end connected to the junction of resistor R3 and the input to transistor Q1. The other end of resistor R4 is connected to system voltage +V at its junction with transistor Q1. Resistors R3 and R4 serve as voltage divider resistors. Diode D2, connected between the output of transistor Q1 and the input to capacitor C1, protects the circuit of transistor Q1. When driven conductive, transistor Q1 energizes relay 10 through diode D2, capacitor C1 and diode D1.

Input 12 can also be used to operate relay 10 in response to the output of a radio receiver activated by a remotely generated radio signal produced by a hand-held radio transmitter operated in the vicinity of the vehicle being hijacked.

Input 13 would be connected to the vehicle ignition start circuit, and would apply system voltage +V through resistor R5 and diode D3 to energize relay 10.

The circuit through the coil in sensor relay 10 is completed to ground through maintenance switch 14. This switch is normally closed and is opened by the vehicle operator before turning in the vehicle for service.

System voltage +V is supplied to contact 15 of relay 10 under control of primary reset switch 16 which is normally closed. When sensor relay 10 is energized momentarily by one of the inputs 11 through 13, contacts 15, 17 (normally open) are closed providing a latching circuit completed through resistor R6 and the coil of relay 10 to ground through maintenance switch 14. Relay 10 will remain energized until primary reset switch 16 is momentarily opened. Reset switch 16 can be a simple pushbutton switch hidden from view, a coded electronic switch mounted at an accessible location, or a key-operated switch located at an accessible location.

An optional secondary reset switch 19 is provided to enable sensor relay 10 to be deenergized as an alternative to the primary reset switch 16. Secondary reset switch 19 is utilized to connect ground directly to the input of relay 10. When switch 19 is closed, the coil in relay 10 is shunted to deenergize the relay. Switch 19, while shown in the drawing as a single pole/single throw switch, can take various forms such as a magnetic switch, a voice controlled switch or a finger operated capacitive switch.

An optional control, either operated manually or by radio signal, can be provided to operate sensor relay 10 independently of normal inputs 11–13. Such a control can be at input 20 at the junction of resistors R3 and R4. When a radio signal is used, a radio receiver and amplifier would be connected to input 20. The receiver would be activated by an external transmitter.

Bus 23, connected to contact 17 of relay 10, supplies system voltage +V, as described in more detail below, to a number of components when relay 10 is energized. LED1 (a light emitting diode), connected between ground and bus 23, glows red when relay 10 is energized and goes out when relay 10 is deenergized. LED2, having one end connected to ground and the other end connected to contact 24 (normally closed with respect to contact 15) of relay 10, emits a green light when relay 10 is deenergized and goes out when relay 10 is energized. LED2, when lighted, indicates the vehicle is in condition for normal operation and the system is ready to be armed. LED1, when lighted, indicates the system is armed. Normally opened contacts 25,26 of relay 10 are closed when relay 10 is energized, and are adapted to operate an optional gas gauge override circuit to artificially indicate an empty gas tank.

A mode switch 29, which is a commercially available double pole/double throw switch, is operable in two switching positions labeled "R" and "P", where "R" stands for run and "P" stands for park. The function of this switch will be described in more detail below. While mode switch 29 is a switch operable by a single lever, it is illustrated as two separate sections, section "A" and section "B" for convenience of explanation. The drawing shows the system with mode switch 29 positioned in the run mode.

Energization of bus 23 sets two timers in operation, a main timer 27 and a secondary timer 28, each shown enclosed in dashed lines. The operation of the timers will be explained in terms of a run mode of operation. In this mode, it is assumed that a thief has forcibly taken the vehicle from its owner and has driven off with it.

Main timer 27 employs a conventional RC timing circuit wherein capacitor C2 (having one end grounded) is charged through adjustable resistor R7 and field effect transistor (FET) Q5 connected to bus 23. FET Q6 has its input connected between the junction of capacitor C2 with adjustable resistor R7 and has its output provided to transistor Q7 via resistor R8. System voltage +V is applied from bus 23 to FETs Q5 AND Q6 when relay 10 is energized. After capacitor C2 reaches its predetermined charge, FET Q6, acting through resistor R8, turns on transistor Q7 to energize main output control relay 30, which has system voltage +V applied thereto via bus 23. Resistor R9, connected between transistor Q7 and ground, is a bias resistor for Q7.

The length of the main timer cycle, beginning with the energization of sensor relay 10 and ending with energization of main output control relay 30, can be adjusted by means of adjustable resistor R7. Typical cycle times would be between six to ten minutes.

Output control relay 30 is a commercially available, four pole/double throw, 12V relay. One example of such a relay is currently available at Radio Shack as Part Number 275-214. This relay is provided with a number of contacts, here shown as nine in number and individually numbered 31–39. The contacts are connected to various circuits as labeled on the drawing. The details thereof will be described hereinafter in the operational descriptions of the invention. For convenience, the contacts have been paired in the table below in their switching relationships and identified as open "O" or closed "C", depending upon the state of energization of control relay 30.

| OUTPUT CONTROL RELAY 30 | | | |
|---|---|---|---|
| DEENERGIZED | | ENERGIZED | |
| (31,32) | O | (31,32) | C |
| (32,33) | C | (32,33) | O |
| (34,35) | C | (34,35) | O |
| (36,37) | C | (36,37) | O |
| (38,39) | O | (38,39) | C |

Secondary timer 28, connected to bus 23 by conductor 40, is simultaneously energized with main timer 27. Timer 28 is similar to timer 27 in that capacitor C3 (having one end grounded) is charged through adjustable resistor R10 and FET Q8 connected to bus 23 via conductor 40. FET Q9 has its control input connected from the junction of capacitor C3 and adjustable resistor R10, its output coupled to transistor Q10 via resistor R11, and system voltage +V applied from bus 23 via line 40 when sensor relay 10 is energized. After capacitor C3 reaches its predetermined charge, FET Q9, acting through resistor R11, turns on transistor Q10 to energize secondary control relay 41, which is a commercially available single pole/double throw relay. One example of such a relay is currently available at Radio Shack as Part Number 275-243. Resistor R12, connected between transistor Q10 and ground, is a bias resistor for transistor Q10. The only difference between timer 27 and 28 is that timer 28 is designed for a shorter timing cycle, a cycle time of two minutes being typical.

Energization of secondary control relay 41, after a delay of about two minutes, results in normally open contacts 42, 43 being closed, allowing system voltage +V (adapted to be connected to contact 42) to be applied to contact 43 to activate interrupter 44 through resistor R13. At the same time, an optional tape player, adapted to be connected to contact 43, can be activated to warn the driver that operation of the vehicle will be curtailed.

Interrupter 44 can be a commercially available device such as an intermittent relay, solid state component, or blinking gas discharge tube. The action of the interrupter is to operate transistor Q11, which is connected between interrupter 44 and ground and which has its output connected to interrupter control relay 45, in an on-off erratic manner, thereby operating interrupter control relay 45 in the same manner. Relay 45 is a commercially available double pole/double throw relay. One example of such a relay is currently available at Arcade Electronics as Jim-Pak Type HB212.

Upon activation of interrupter control relay 45, its normally closed contacts 46,47 are operated in an intermittent manner to cause erratic operation of the ignition and/or electronic fuel injection (EFI) systems of the vehicle. More specifically, the engine distributor voltage and/or EFI control voltage, adapted to be connected to contact 46, is routed intermittently through contacts 46,47 of relay 45 to normally closed contacts 36,37 of relay 30 to the ignition module and/or the EFI electronic control module (adapted to be connected to contact 37).

At the same time, section B of the mode switch 29, being in the "R" position, allows system voltage +V to pass via contacts 48,49 of relay 45 to energize, in an intermittent manner, the hazard lights of the vehicle, which hazard lights are adapted to be connected to the "R" terminal of mode switch 29, section B. Diode D7, connected between the "R" and "P" terminals of section B of mode switch 29, isolates an alarm device (adapted to be connected to the "P" terminal) to prevent its sounding.

The vehicle will continue to operate in an erratic manner under control of timer 28 until main timer 27 completes its timing cycle and energizes output control relay 30. Upon energization of relay 30, contacts 36,37 open, cutting off current to the ignition module and/or EFI module, to stop the engine; contacts 34,35 open, disabling the engine starting system; contacts 38, 39 close, applying system voltage +V (adapted to be connected to contact 39) energizing the hazard lights (adapted to be connected to contact 38 through a conventional flasher) through the contacts; 31,32 close, energizing an optional radio transmitter or any other signalling device (adapted to be connected to contact 31); and contacts 32,33 open, deenergizing relays 41 and 45 by removing system voltage +V (adapted to be connected to contact 32) from the relays.

System voltage +V, referred to herein, can be derived from the vehicle battery 50 via fuse F1 and bus 53. Referring to the drawing, all places labeled +V are adapted to be connected to bus 53.

Circuitry connected to the movable arm 51 of mode switch 29, section A, does not interact with timer 27 or 28 in the run mode. This circuitry includes resistor R15, connected serially from movable arm 51 to capacitor C4, which, in turn, is connected to ground. The junction of resistor 15 and capacitor C4 is connected to diode D4, which, in turn, is connected to the junction of resistor R11 and transistor Q10. Other components of this circuitry include the serial arrangement of diode D6, resistor R14 and strap B connected, in that order, between movable arm 51 of mode switch 29, section A and the junction of resistor R8 and the input to transistor Q7. The last item of the circuitry connected to the movable arm 51 of mode switch 29, section A is diode D5, which is connected from movable arm 51 to system voltage +V at the junction where this voltage is adapted to be coupled to both relays 41 and 45 via contacts 32,33 of relay 30. The functions of these circuit components are given below for each mode of operation.

In the run Mode (mode switch 29, section A, in the "R" position), diodes D4 and D6 act as open switches to isolate the input to transistor Q7 of the main timer 27 from the input to transistor Q10 of the secondary timer 28, thereby preventing interaction between the two timers, and diode D5 acts as an open switch between the system voltage +V (at the junction between relays 41 and 45) and the movable arm 51 of mode switch 29, section A.

In the Park Mode (mode switch 29, section A, in the "P" position and strap B present), diodes D4 and D6 will automatically act as closed switches to connect system voltage +V, on bus 23, to the inputs of transistor Q7 (in the main timer 27) and transistor Q10 (in the secondary timer 28) to drive these two transistors conductive when sensor relay 10 is energized by an input signal at inputs 11–13. This causes immediate energization of main output control relay 30, and, after a short predetermined time, energization of secondary output control relay 41 and interrupter control relay 45. (The results of the operation of these relays have been described in more detail above.) At the same time, diode D5 automatically acts as a closed switch to apply the system voltage +V from bus 23 to relays 41 and 45.

In the park Mode (mode switch 29, section A, in the "P" position and strap B absent), diode D6 and resistor R14 are inactive due to the open circuit in the absence of strap B, allowing main timer 27 to complete its normal time cycle of six to ten minutes before energizing main output control relay 30.

A step by step operational description of the vehicle anti-hijacking/anti-theft system in the normal run mode will now be given. Maintenance switch 14 and primary reset switch 16 are in their closed positions and the mode switch 29 is in the "R" position. Assume a hijacker forcibly takes the keys from the owner as the owner approaches the vehicle. The hijacker opens the door, starts the engine and drives off. Opening the door and/or starting the engine energizes sensor latch relay 10. This is accomplished by any one of the inputs 11, 12 or 13 applying a signal to sensor latch relay 10. With sensor latch relay 10 energized, contacts 15,17 thereof are closed, thereby applying system voltage +V through resistor R6 as a feed-back to sensor latch relay 10 latching it in a hold position. At the same time, closure of contacts 15,17 places system voltage +V on bus 23.

Activation of bus 23 simultaneously sets timers 27 and 28 in operation. Main timer 27 is set for a period of about ten minutes as determined by FET Q5 and RC Timing circuit adjustable resistor R7 and capacitor C2. After about ten minutes, capacitor C2 becomes fully charged resulting in FET Q6 being turned on, causing transistor Q7 to conduct, via resistor R8, to energize output control relay 30.

Secondary timer 28 is set for a period of about two minutes as determined by FET Q8 and RC timing circuit adjustable resistor R10 and capacitor C3. After about two minutes, capacitor C3 becomes fully charged resulting in FET Q9 being turned on causing transistor Q10 to conduct, via resister R11, to energize secondary output control relay 41.

Energization of control relay 41 closes contacts 42, 43 thereof and turns on an optional tape player (adapted to be connected to contact 43) to warn the hijacker to get the vehicle off the road as it will shortly cease operation. At the same time, interrupter 44 is placed in operation and periodically drives transistor Q11 conductive to effect intermittent operation of interrupter control relay 45. Contacts 46, 47 of relay 45 carry the distributor voltage or EFI control voltage through normally closed contacts 36, 37 of output control relay 30 to control the ignition and/or EFI modules. Rapid opening and closing of contacts 46, 47 of relay 45 greatly reduces engine power by interrupting operation of the ignition and/or EFI modules. Erratic operation of the engine limits the power of the engine yet making it possible to get the vehicle out of traffic to the side of the road.

Intermittent operation of relay 45 also opens and closes contacts 48, 49 (adapted to be connected, respectively, to system voltage +V and hazard lights, the latter via arm 52 of mode switch 29, section B and the "R" terminal thereof) to energize the vehicle hazard lights intermittently through the mode switch 29, section B.

Erratic operation of the vehicle will continue until main timer 27 completes its timing cycle to energize relay 30. When relay 30 becomes energized, contacts 36, 37 open, disconnecting the ignition and/or EFI modules, thereby shutting down completely the vehicle engine. At the same time, contacts 34, 35 open, disconnecting the ignition starting circuits; contacts 32, 33 open, deenergizing relays 41 and 45; contacts 38, 39 close, energizing the hazard lights; and contacts 32, 31 close, energizing an optional radio transmitter or other signalling device adapted to be connected to contact 31.

The invention not only provides protection against hijacking but also protects the vehicle when parked. The mode switch 29, when switched to the "P" position, places the system in a parking protection mode. Diodes D4, D5 and D6, the operation of which has been described above, now come into play.

With mode switch 29 in position "P" two options are available depending upon the presence or absence of strap B. With strap B present, whenever a car thief breaks into the parked car and attempts to start it, one of the sensed inputs 11-13 will trigger relay 10 and energize bus 23. Output relay 30 is immediately energized because bus 23 applies system voltage +V directly to transistor Q7 (via line 40, position "P" and movable arm 51 of mode switch 29, section A, diode D6, resistor R14 and strap B) rather than transistor Q7 having to wait for the charging of capacitor C2. In essence, timing circuit 27 is ineffective or bypassed in this operational mode.

Energization of output control relay 30 immediately disables the vehicle by opening contacts 34, 35 and contacts 36, 37, thereby eliminating the starting and running capability of the engine. At the same time, contacts 38, 39 close, energizing the hazard lights. As an optional feature, a radio transmitter, adapted to be connected to contact 31, may be activated by closure of contacts 31, 32.

Energization of relay 30 also opens contacts 32, 33 and removes system voltage +V from relays 41 and 45. However, system voltage +V is now applied to relays 41 and 45 from bus 23, via line 40, position "P" and movable arm 51 of mode switch 29, section A and diode D5. Moreover, as explained above, relays 41 and 45 are maintained in their energized state by transistors Q10 and Q11, respectively, being in their conductive state by the direct application of system voltage +V from bus 23 via line 40, mode switch 29, section A, terminal P and movable arm 51 thereof, resistor R15 and diode D4 to the input of transistor Q10, and from contact 43 of relay 41, via resistor R13 and interrupter 44, to the input of transistor Q11.

Intermittent function of relay 45, as explained in connection with the run mode of operation, causes an alarm such as a horn to be intermittently sounded. The alarm would be adapted to be connected to the "P" terminal of mode switch 29, section B. Diode D7, connected between the "R" and "P" terminals of mode switch 29, section B, causes operation of the hazard lights along with the alarm in this park mode, but isolates the alarm circuit to prevent it from operating the alarm when the mode switch 29, section B is in the "R" position.

As stated above with respect to timer circuit 27, timer circuit 28 is also ineffective or bypassed in this operational mode since the system voltage +V is applied directly to transistor Q10 rather than transistor Q10 having to wait for the charging of capacitor C3.

In order to prevent the alarm from intermittently sounding when the owner returns to the parked vehicle and opens the door, a time delay of about thirty seconds is provided by RC circuit resistor R15 and capacitor C4 before secondary relay 41 is energized. This allows enough time for the owner to enter the vehicle and, move the mode switch from the "P" to the "R" position. After starting the vehicle, it is only necessary to operate the reset switch 16 to return the system to an unarmed condition, thereby allowing the vehicle owner to drive the vehicle normally.

With strap B absent and after a sensed condition at any one of inputs 11-13, secondary output control relay 41 is energized (through resistor R15, diode D4 and transistor Q10, with a short time delay caused by capacitor C4 in conjunction with resistor R15, as described above) which, in turn, energizes intermittent control relay 45 (through resistor R13, interrupter 44 and transistor Q11, as described above) to sound the alarm. However, main timer 27 runs through a normal timing cycle (allowing the vehicle to be operated in an intermittent manner) to energize relay 30 and completely disable the vehicle engine as described above in connection with the run mode. The alarm, when utilized with the system, will continue to sound until the mode switch 29 is returned to the "R" position. Normal operation of the vehicle can be restored by pressing the reset switch 16.

In the normal operation of the security system for the vehicle, the mode switch 29 is left in the run mode for protection against hijacking. Upon leaving the vehicle, the owner opens the door, presses the reset switch 16 and closes the door. This sets up the system for automatic arming and disablement of the vehicle in case of unauthorized entry. Upon returning, the owner opens the door, starts the engine, and presses the reset switch 16 to open the circuit momentarily and return the system to an unarmed condition. As explained above, signal lamp LED1 glows red when the system has been armed by an input sensed at any one of the inputs 11-13. It goes out and LED2 turns green when the system has been reset, allowing normal operation of the vehicle.

It should be emphasized, although the system has a special park mode (P) of operation, the system can also function in the run mode (R) to protect the vehicle when parked. When in the "R" mode, a thief has only 2 minutes in which to operate the vehicle before intermittent engine disabling commences by timer 28 shortly followed by complete shutdown when timer 27 completes its cycle.

Finally, in the "R" mode, when no action is taken by the owner to reset the system after parking the vehicle and opening the door on exiting therefrom, the system automatically and completely shuts down the vehicle through action of output control relay 30 after completion of the timing cycle of main timer 27. Upon entering the vehicle on return, the owner must press reset switch 16 in order to start the engine, and, once again, after the engine has started, to operate the vehicle normally.

While essentially only one embodiment of the present invention has been specifically disclosed herein, it is apparent that many variations may be made thereto without departing from the spirit and scope of the invention. For example, in place of electro-mechanical relays, electronic solid state relays could be adapted to perform the same functions.

What is claimed is:

1. An automatically operated vehicle anti-hijacker/anti-theft vehicle security system comprising: a sensor relay; a plurality of sensor inputs for said sensor relay, each sensor input having the capability of momentarily energizing said sensor relay; a latching circuit for holding said sensor relay in said energized condition; primary reset means operable to interrupt said latching circuit and restore said sensor relay to its deenergized condition; a voltage bus connected to said sensor relay and energized only when said sensor relay is energized; main and secondary timers connected to said voltage bus to commence main and secondary timing cycles, respectively, upon energization of said voltage bus, said main and secondary timers controlling a main output control relay and a secondary output control relay, respectively, with said main timing cycle being longer than said secondary timing cycle, said secondary output control relay having an output circuit for energizing an intermittent control relay when said second timer actuates said secondary output control relay; intermittent means in circuit between said secondary output control relay and said intermittent control relay to cause rapid intermittent operation of said intermittent relay; and circuit means for routing the engine distributor voltage or EFI control voltage intermittently in a series path to the engine ignition and/or EFI modules through a switching output on said intermittent control relay and normally closed contacts on said main output control relay, whereby engine operation is sharply reduced in power until said main timer energizes the main control relay to open said normally closed distributor voltage contacts on said main output control relay to shut down engine operation completely by opening the circuit to the distributor or EFI modules.

2. The combination as claimed in claim 1 wherein said plurality of sensor inputs includes at least one door sensor and an engine start circuit sensor.

3. The combination as claimed in claim 2 including a second door sensor wherein one door sensor is responsive to a door switch providing a positive voltage while the second door sensor is responsive to a door switch providing a ground connection.

4. The combination as claimed in claim 1 wherein said primary reset means comprises a mechanical switch in a hidden location inside the vehicle, said switch being in series with the voltage supply for said sensor relay.

5. The combination as claimed in claim 4 including a secondary reset switch wired in shunt with said sensor relay whereby said voltage supply to said sensor relay is shunted to ground by actuation of said secondary reset switch to deenergize said sensor relay.

6. The combination of claim 1 having an input circuit connected to said sensor relay adaptive to be responsive to a radio controlled signal for actuating said sensor relay independently of said sensor inputs.

7. The combination of claim 1 including a first LED which is energized when said sensor relay is energized and a second LED which is energized when said sensor relay is deenergized.

8. The combination claimed in claim 1 wherein the time delays of said main and secondary timers are basically determined by respective adjustable RC circuits, one cooperating with each of said timers.

9. The combination as claimed in claim 1 wherein said main output control relay includes two pairs of normally open contacts, one contact of each pair being adapted to be connected to a voltage supply, the other contact of each pair being adapted to be connected to signalling devices, said signalling devices becoming energized when said main output control relay is energized, closing said two pairs of contacts.

10. The combination of claim 1 including a normally open contact pair on said intermittent control relay, one contact of said pair being adapted to be connected to said voltage supply, the other contact being adapted to be connected to at least one signalling device, said signalling device being activated by energization of said intermittent control relay whereby said signalling device can be operated when said main output control relay is deenergized.

11. The combination of claim 1 including a two position mode switch defining a run mode and a park mode, circuit means operative when said mode switch is in said park mode to directly operate said main output control relay when said sensor relay is energized.

12. The combination of claim 11 wherein said circuit means includes a branch circuit to operate said second output control relay after a predetermined time delay.

13. A method for protecting a motor vehicle from theft comprising: providing a sensor relay responsive to a plurality of sensor inputs detecting door opening and engine starting to latch said sensor relay in an energized state; providing a main and secondary timer simultaneously energized with said sensor relay, the time cycle of said main timer being longer than said secondary timer; providing a main output control relay and a secondary output control relay connected to said main and secondary timers, respectively; connecting an intermittently operated control relay to said secondary output control relay to be operated in an intermittent manner when said secondary output control relay is energized; routing the engine distributor voltage or EFI control voltage in a series path to the engine ignition or EFI modules through a switching output on said intermittent control relay and normally closed contacts on said main output control relay whereby said motor vehicle is operative in a partially disabled manner until said main timer operates to energize the main output control relay to terminate operation of the vehicle.

14. The method of claim 13 including the step of operating a reset switch under control of the authorized operator of the vehicle to deenergize the sensor relay and reset the system.

15. The method of claim 13 including the step of providing signalling devices operative when the main output control relay is energized.

* * * * *